United States Patent
Yajima

(10) Patent No.: US 10,994,725 B2
(45) Date of Patent: May 4, 2021

(54) FOUR-WHEEL-DRIVE VEHICLE

(71) Applicant: JTEKT CORPORATION, Osaka (JP)

(72) Inventor: Hiroki Yajima, Okazaki (JP)

(73) Assignee: JTEKT CORPORATION, Osaka (JP)

( * ) Notice: Subject to any disclaimer, the term of this patent is extended or adjusted under 35 U.S.C. 154(b) by 34 days.

(21) Appl. No.: 16/432,327

(22) Filed: Jun. 5, 2019

(65) Prior Publication Data

US 2019/0375398 A1  Dec. 12, 2019

(30) Foreign Application Priority Data

Jun. 7, 2018 (JP) .............................. JP2018-109741

(51) Int. Cl.
*B60W 30/08* (2012.01)
*B60W 10/119* (2012.01)
*B60K 17/34* (2006.01)
*B60K 17/354* (2006.01)
*B60K 17/02* (2006.01)

(52) U.S. Cl.
CPC .......... *B60W 30/08* (2013.01); *B60W 10/119* (2013.01); *B60K 17/02* (2013.01); *B60K 17/34* (2013.01); *B60K 17/354* (2013.01); *B60W 2510/1005* (2013.01); *B60W 2510/20* (2013.01); *B60W 2520/403* (2013.01); *B60W 2540/18* (2013.01); *B60W 2710/02* (2013.01)

(58) Field of Classification Search
CPC ....... B60W 10/119; B60W 2510/1005; B60W 2510/20; B60W 2520/403; B60W 2540/18; B60W 30/08; B60W 2710/02; B60W 2720/403; B60W 10/14; B60W 30/09; B60W 40/02; B60K 17/34; B60K 17/354
USPC .......................................................... 701/69
See application file for complete search history.

(56) References Cited

U.S. PATENT DOCUMENTS

| | | | |
|---|---|---|---|
| 2017/0050516 A1* | 2/2017 | Imafuku | B60K 23/0808 |
| 2018/0162444 A1* | 6/2018 | Park | B60W 10/22 |
| 2018/0257487 A1* | 9/2018 | Ohkawa | B60K 17/351 |
| 2019/0184978 A1* | 6/2019 | Park | B60W 10/18 |
| 2019/0359204 A1* | 11/2019 | Saito | B60W 30/08 |

FOREIGN PATENT DOCUMENTS

| | | |
|---|---|---|
| JP | 2006-154967 | 6/2006 |
| JP | 2008-62929 | 3/2008 |

* cited by examiner

*Primary Examiner* — Roger L Pang
(74) *Attorney, Agent, or Firm* — Oblon, McClelland, Maier & Neustadt, L.L.P.

(57) ABSTRACT

A four-wheel-drive vehicle including a powertrain operable to adjust a front- and rear-wheel driving force ratio that is a ratio between a driving force of front wheels and a driving force of rear wheels includes a control device that controls the powertrain and adjusts the front- and rear-wheel driving force ratio so as to reduce the driving force of the front wheels that are steered wheels, when it is detected that emergency avoidance to avoid collision with an avoidance target ahead in a traveling direction is necessary.

4 Claims, 5 Drawing Sheets

FOUR-WHEEL-DRIVE VEHICLE

INCORPORATION BY REFERENCE

The disclosure of Japanese Patent Application No. 2018-109741 filed on Jun. 7, 2018 including the specification, drawings and abstract, is incorporated herein by reference in its entirety.

BACKGROUND OF THE INVENTION

1. Field of the Invention

The invention relates to a four-wheel-drive vehicle including a powertrain operable to adjust a front- and rear-wheel driving force ratio, which is a ratio between a driving force of front wheels and a driving force of rear wheels.

2. Description of Related Art

Some of four-wheel-drive vehicles that distribute a driving force of a driving source, such as an engine, to front wheels and rear wheels are configured to switch a driving mode from a two-wheel-drive mode to a four-wheel-drive mode when a slippage or skid occurs during traveling in the two-wheel-drive mode. A four-wheel-drive vehicle described in Japanese Patent Application Publication No. 2008-62929 (JP 2008-62929 A) includes a powertrain configured to transmit a driving force of a driving source only to the rear wheels in the two-wheel-drive mode, but transmit the driving force to the front wheels and the rear wheels in the four-wheel-drive mode by engaging a clutch in a transfer.

Vehicles equipped with a warning device that monitors ahead in a traveling direction using an in-vehicle camera and, upon recognizing an object with which the vehicle can collide, issues a warning that urges a driver to make an emergency avoidance operation are spreading in recent years. An example of such a vehicle is disclosed in Japanese Patent Application Publication No. 2006-154967 (JP 2006-154967 A).

When a warning is issued in a vehicle equipped with such a warning device as described above, a driver typically makes a braking or steering operation in an attempt to avoid collision with the object. When a steering operation is made to avoid collision, it is desirable that the vehicle have high cornering ability or, more specifically, the vehicle is highly capable of changing its traveling direction immediately to a steering direction. However, a four-wheel-drive vehicle traveling in the four-wheel-drive mode exhibits relatively low cornering ability, while exhibiting high straight-ahead driving stability, and therefore is typically less suitable for avoiding collision by steering operation.

SUMMARY OF THE INVENTION

An object of the invention is to provide a four-wheel-drive vehicle including a powertrain operable to adjust a front- and rear-wheel driving force ratio that is a ratio between a driving force of front wheels and a driving force of rear wheels, and having cornering ability that can be increased in case of emergency avoidance to avoid collision with an avoidance target by steering the front wheels.

According to an aspect of the invention, a four-wheel-drive vehicle includes a powertrain that adjusts a front- and rear-wheel driving force ratio that is a ratio between a driving force of front wheels and a driving force of rear wheels, and a control device that controls the powertrain. When it is detected that emergency avoidance to avoid collision with an avoidance target ahead in a traveling direction is necessary, the control device adjusts the front- and rear-wheel driving force ratio so as to reduce the driving force of the front wheels that are steered wheels.

In the four-wheel-drive vehicle according to the above aspect, cornering ability can be increased in case of emergency avoidance to avoid collision with an avoidance target by steering the front wheels.

BRIEF DESCRIPTION OF THE DRAWINGS

The foregoing and further features and advantages of the invention will become apparent from the following description of example embodiments with reference to the accompanying drawings, wherein like numerals are used to represent like elements and wherein.

DETAILED DESCRIPTION OF EMBODIMENTS

Figure 1:
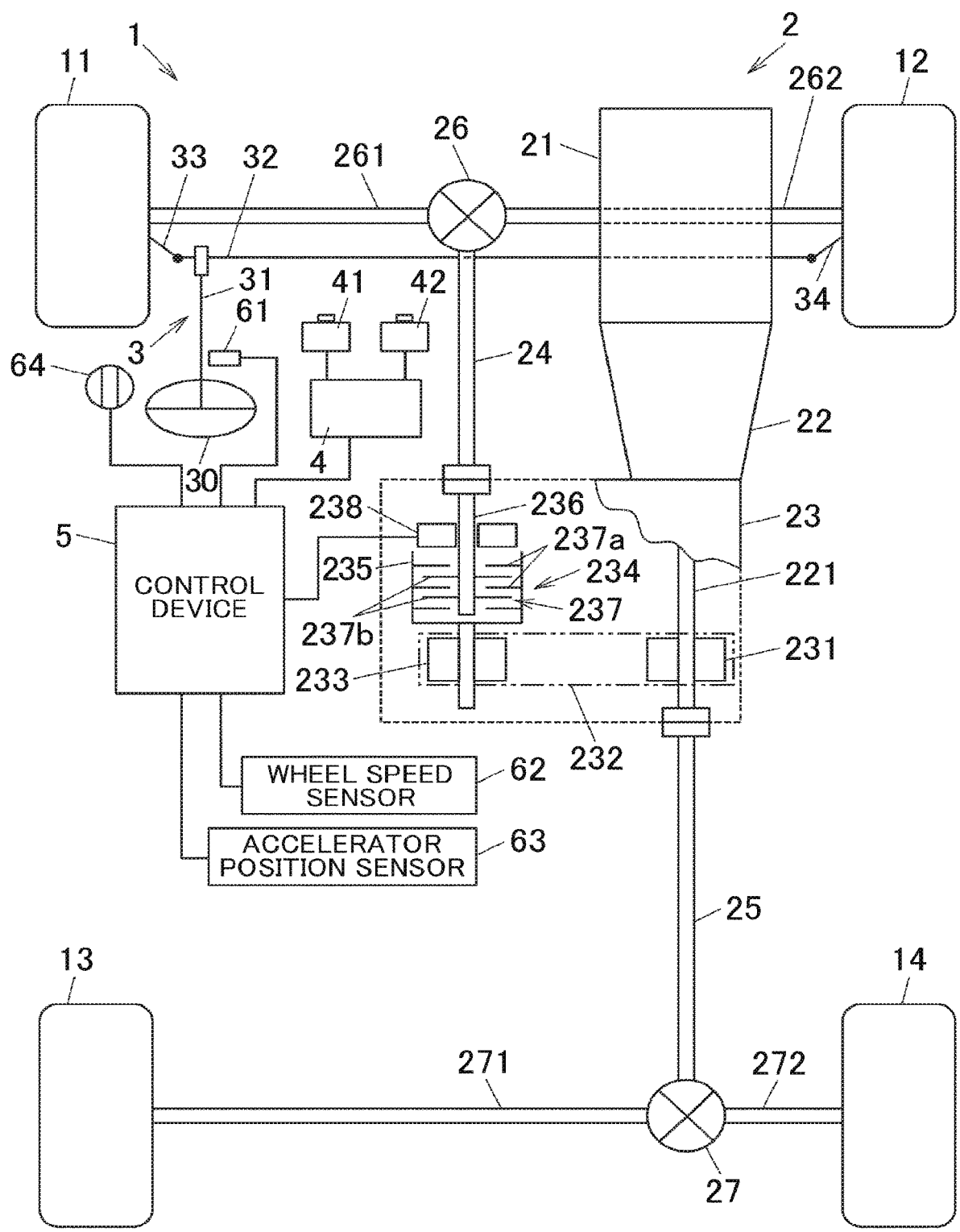
FIG. 1 is a schematic diagram illustrating an example configuration of a four-wheel-drive vehicle according to an embodiment of the invention.

Embodiments of the invention are described below with reference to the drawings. FIG. 1 is a schematic diagram illustrating an example configuration of a four-wheel-drive vehicle 1 according to an embodiment of the invention. The four-wheel-drive vehicle 1 includes a powertrain 2 that drives a left front wheel 11, a right front wheel 12, a left rear wheel 13, and a right rear wheel 14, a steering system 3 that steers the right and left front wheels 12 and 11 in accordance with a steering operation of a steering wheel 30 serving as a steering member, a collision avoidance warning device 4 that detects an avoidance target, collision with which is to be avoided, based on images captured by a left in-vehicle camera 41 and a right in-vehicle camera 42, and a control device 5 that controls the powertrain 2. Examples of the avoidance target include a pedestrian, another vehicle that is traveling or stationary, a fallen object, and a construction safety fence.

The powertrain 2 includes an engine 21 serving as a driving source, a transmission 22 that performs speed conversion on the driving force of the engine 21 and outputs the converted driving force, a transfer 23 that distributes the driving force output from the transmission 22 to the front wheels 11 and 12 (hereinafter, sometimes simply referred to as the front wheels) and the rear wheels 13 and 14 (hereinafter, sometimes simply referred to as the rear wheels), a propeller shaft 24 for the front wheels and a propeller shaft 25 for the rear wheels, a differential gear 26 for the front wheels and a differential gear 27 for the rear wheels, drive shafts 262 and 261 for the right and left front wheels, and drive shafts 272 and 271 for the right and left rear wheels.

The transfer 23 includes a drive pulley 231 attached to a rotary output shaft 221 of the transmission 22, an endless belt 232 disposed around the drive pulley 231, a driven pulley 233 that receives a driving force from the drive pulley 231 via the endless belt 232, and a clutch system 234 disposed between the driven pulley 233 and the propeller shaft 24 for the front wheels.

The clutch system 234 includes a clutch housing 235 that rotates together with the driven pulley 233, an inner shaft 236 that rotates together with the propeller shaft 24 for the front wheels, a multiple disc clutch 237 configured by a plurality of clutch plates disposed between the clutch housing 235 and the inner shaft 236, and an actuator 238 that presses the multiple disc clutch 237.

The multiple disc clutch 237 is formed by alternately arranging a plurality of outer clutch plates 237a engaged with the clutch housing 235 so as to be axially movable but non-rotatable relative to the clutch housing 235 and a plurality of inner clutch plates 237b engaged with the inner shaft 236 so as to be axially movable but non-rotatable relative to the inner shaft 236. The actuator 238 applies a pressing force that presses the outer clutch plates 237a and the inner clutch plates 237b against each other into frictional engagement.

The actuator 238 presses the multiple disc clutch 237 with a pressing force in accordance with an electric current supplied from the control device 5. A driving-force transmission capacity of the multiple disc clutch 237 increases as the pressing force applied by the actuator 238 increases. In other words, the clutch system 234 is controlled by the control device 5 and has the variable driving-force transmission capacity. The actuator 238 may be specifically configured such that, for example, a cam mechanism converts a rotating force of an electric motor into an axial cam thrust or, alternatively, such that a torque transmitted by an electromagnetic clutch that is actuated by a magnetic force of an electromagnet generates a cam thrust of a cam mechanism. Further alternatively, the actuator 238 may be configured so as to hydraulically press the multiple disc clutch 237 using a hydraulic pump driven by an electric motor.

The driving force of the engine 21 is constantly transmitted to the rear wheels 13 and 14 via the transmission 22, the propeller shaft 25 for the rear wheels, the differential gear 27 for the rear wheels, and the drive shafts 272 and 271 for the right and left rear wheels. The driving force of the engine 21 is transmitted to the front wheels 11 and 12 via the transmission 22, the drive pulley 231, the endless belt 232, the driven pulley 233, the clutch system 234, the propeller shaft 24 for the front wheels, the differential gear 26 for the front wheels, and the drive shafts 262 and 261 for the right and left front wheels. The clutch system 234 can engage and disengage driving force transmission to the front wheels 11 and 12.

The steering system 3 includes a steering shaft 31 that rotates in accordance with a steering operation of the steering wheel 30, a rack shaft 32 that meshes with the steering shaft 31 and moves back and forth in a vehicle width direction, and a left tie rod 33 and a right tie rod 34 individually coupled to one of opposite ends of the rack shaft 32 in a swingable manner. When the steering wheel 30 is steered, the rack shaft 32 moves in the vehicle width direction, causing the right and left front wheels 12 and 11, which are steered wheels, to be steered via the right and left tie rods 34 and 33. A steering angle of the steering wheel 30 is detected by a steering angle sensor 61.

Upon discovering a monitoring target with which the vehicle 1 may collide ahead in a traveling direction via the in-vehicle cameras 41 and 42, the collision avoidance warning device 4 determines whether emergency avoidance to avoid collision with the monitoring target is necessary taking into account, for example, a distance between the monitoring target and a subject vehicle (the four-wheel-drive vehicle 1), a direction of relative movement, and an approaching speed. Upon determining that emergency avoidance is necessary, the collision avoidance warning device 4 recognizes (detects) the monitoring target as an avoidance target with which collision should be avoided for the subject vehicle, and warns a driver with a warning sound. The collision avoidance warning device 4 measures a relative position and a relative distance between the subject vehicle and an obstacle, e.g., a guard rail, other than the avoidance target based on images captured by the in-vehicle cameras 41 and 42 and determines a direction to which the front wheels 11 and 12 are to be steered, right or left, to avoid collision with the avoidance target.

The control device 5 can communicate with the collision avoidance warning device 4 and therefore can obtain information indicating that the collision avoidance warning device 4 has detected an avoidance target and information about a result of determination as to a direction to which the front wheels 11 and 12 are to be steered, right or left, to avoid collision with the avoidance target. The control device 5 can further obtain information about a result of detection of the steering angle sensor 61, a result of detection of a wheel speed sensor 62 that detects respective wheel speeds of the right and left front wheels 12 and 11 and the right and left rear wheels 14 and 13, a result of detection of an accelerator position sensor 63 that detects an accelerator position signal in accordance with how far an accelerator pedal is depressed, and an operating state of a drive-mode selector switch 64 operated by a driver via an in-vehicle network, e.g., a controller area network (CAN).

The driver can select any one of a two-wheel-drive mode, a four-wheel-drive mode, and a locked mode using the drive-mode selector switch 64. The two-wheel-drive mode is a mode in which the multiple disc clutch 237 is disengaged to transmit the driving force of the engine 21 only to the rear wheels 13 and 14. The locked mode is a mode in which the multiple disc clutch 237 is fully engaged without causing slippage between the outer clutch plates 237a and the inner clutch plates 237b so as not to produce a difference in rotation speed between the front wheels and the rear wheels. The four-wheel-drive mode is a mode in which the driving-force transmission capacity of the clutch system 234 is increased to distribute a larger driving force to the front wheels 11 and 12 as a stroke of the accelerator pedal increases or as a differential rotation speed that is the difference between a mean rotation speed of the front wheels 11 and 12 and a mean rotation speed of the rear wheels 13 and 14 increases, for example, according to a traveling state of the four-wheel drive vehicle 1.

The powertrain 2, which is controlled by the control device 5, is operable to adjust a front- and rear-wheel driving force ratio, which is a ratio between a driving force of the front wheels 11 and 12 and a driving force of the rear wheels 13 and 14. In the embodiment, the control device 5 adjusts the front- and rear-wheel driving force ratio by controlling the clutch system 234. More specifically, when an electric current supplied to the actuator 238 of the clutch system 234 is increased, a ratio of the driving force distributed to the front wheels 11 and 12 increases to achieve the front- and rear-wheel driving force distribution ratio of 5:5 (5: front wheels; 5: rear wheels) in the locked mode. When no electric current is supplied to the actuator 238, the front- and rear-wheel driving force distribution ratio is 0:10 (0: front wheels; 10: rear wheels). In the four-wheel-drive mode where the control device 5 controls the clutch system 234 depending on a traveling state, the front- and rear-wheel driving force distribution ratio varies between 5:5 and 0:10.

Figure 2:
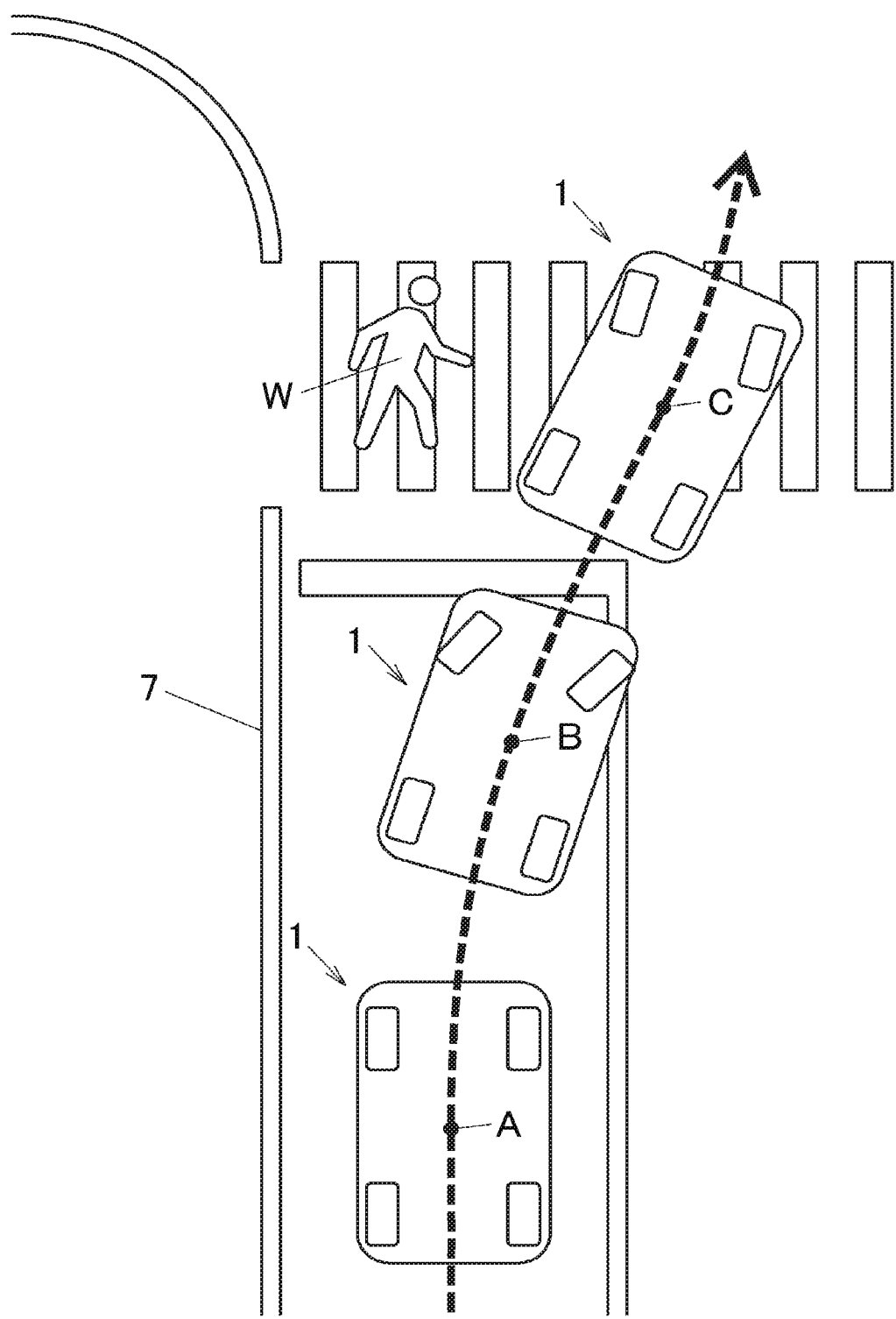
FIG. 2 is a diagram illustrating a situation where a pedestrian enters a roadway from a front left direction when the vehicle is traveling.

FIG. 2 is a diagram illustrating a situation where a pedestrian W enters a roadway from a front left direction when the subject vehicle (the four-wheel-drive vehicle 1) is traveling. The collision avoidance warning device 4 detects the pedestrian W as an avoidance target via the in-vehicle cameras 41 and 42 and issues a warning to the driver. In FIG. 2, a position of the subject vehicle when the collision avoidance warning device 4 detects the pedestrian W as the avoidance target is indicated by A.

In this situation, because there is a guard rail 7 that is an obstacle to the left of the subject vehicle, when it is determined that the subject vehicle cannot stop safely before reaching the pedestrian W, it is desirable that the subject vehicle be steered to the right to avoid collision with the pedestrian W. Therefore, the collision avoidance warning device 4 outputs a signal indicating that an avoidance target is detected and outputs a signal indicating that it is preferable that the subject vehicle be steered to the right to avoid collision with the pedestrian W.

The driver recognizes the pedestrian W visually or based on a warning and steers the steering wheel 30. In FIG. 2, a position of the subject vehicle that is turning to the right because the steering wheel 30 is steered to the right is indicated by B. The control device 5 recognizes that an avoidance target is detected based on the signal output from the collision avoidance warning device 4. The control device 5 adjusts the front- and rear-wheel driving force ratio so as to reduce the driving force ratio of the front wheels 11 and 12 on condition that a steered direction of the subject vehicle (in this example, to the right) determined as being preferable by the collision avoidance warning device 4 is identical to a steering direction of the steering wheel 30 steered by the driver.

As the driving force of the front wheels 11 and 12 decreases, cornering ability of the four-wheel-drive vehicle 1 is increased, which facilitates avoiding an avoidance target. A principle behind this is described below with reference to FIGS. 3A and 3B.

Figure 3A:
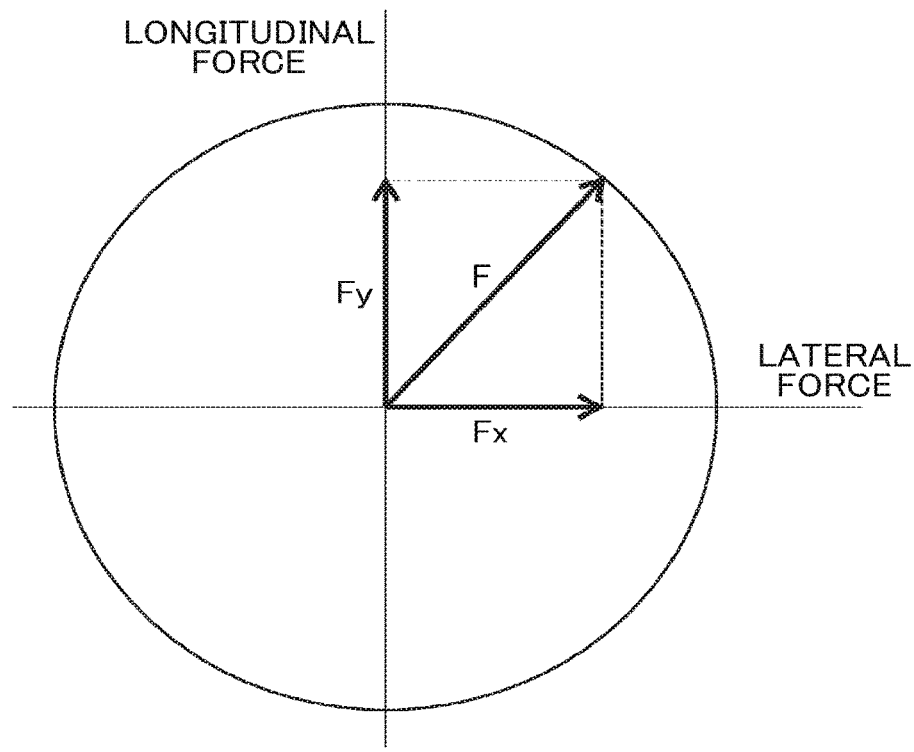
FIG. 3A is an explanatory drawing illustrating a friction circle of front wheels, indicating a state where a driving force is transmitted to the front wheels in a four-wheel-drive mode.
Figure 3B:
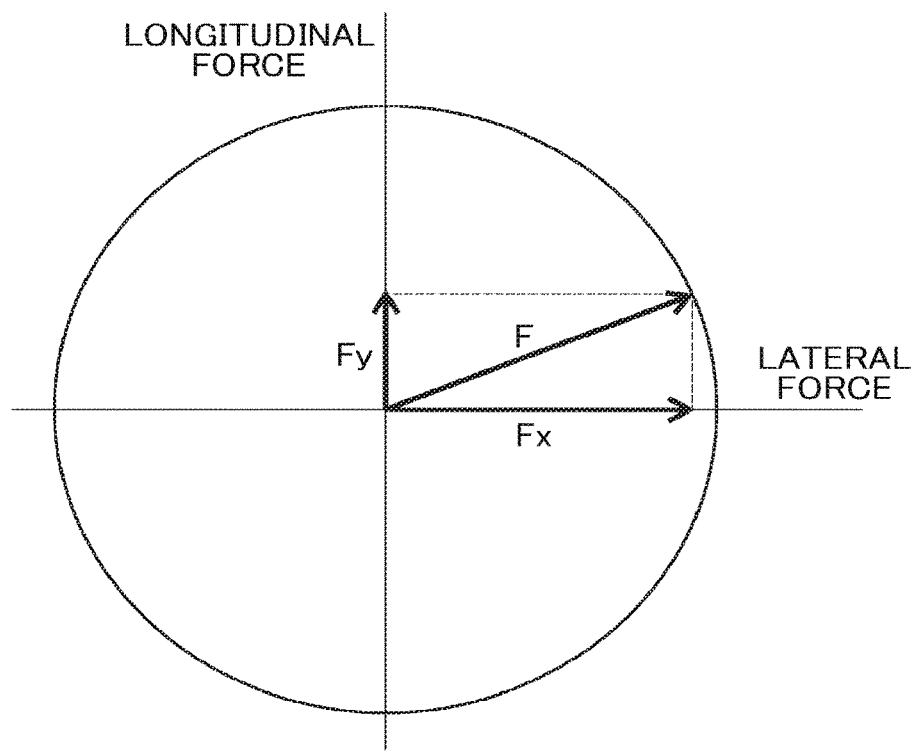
FIG. 3B is an explanatory drawing illustrating a friction circle of the front wheels, indicating a state where the driving force transmitted to the front wheels is reduced.

FIG. 3A is an explanatory drawing illustrating a friction circle of the front wheels 11 and 12, indicating a state where a driving force is transmitted to the front wheels 11 and 12 in the four-wheel-drive mode. FIG. 3B is an explanatory drawing illustrating a friction circle of the front wheels 11 and 12, indicating a state where the driving force transmitted to the front wheels 11 and 12 is reduced. The size of the friction circles illustrated in FIG. 3A and FIG. 3B indicates a maximum value of a friction force between tires and a road surface obtained by multiplying a coefficient of friction between the tires and the road surface by a normal load. The horizontal axis of FIG. 3A and FIG. 3B indicates a lateral force of the tires, while the vertical axis indicates a longitudinal force of the tires.

As is known, a resultant force F of a longitudinal force Fy and a lateral force Fx never exceeds the radius of the friction circle. Accordingly, reducing the driving force transmitted to the front wheels 11 and 12 increases a maximum value of an obtained lateral force as illustrated in FIG. 3B. FIG. 3B illustrates a state where the driving force transmitted to the front wheels 11 and 12 is reduced to a half of the driving force of FIG. 3A. The maximum value of the lateral force can be further increased by disconnecting driving force transmission to the front wheels 11 and 12 by disengaging the multiple disc clutch 237. An increase in the lateral force increases cornering ability of the four-wheel-drive vehicle 1, which facilitates avoiding collision with the avoidance target (the pedestrian W).

As for the rear wheels 13 and 14, because the reduced amount of the driving force of the front wheels 11 and 12 is added to the driving force of the rear wheels 13 and 14, adhesion of the tires is brought close to its limit value by an increase of the longitudinal force. When the adhesion of the tires exceeds its limit value due to a centrifugal force generated when the four-wheel-drive vehicle 1 turns to avoid the avoidance target, oversteer occurs. The oversteer further changes the direction of the four-wheel-drive vehicle 1 by a great degree. Accordingly, the oversteer also facilitates avoiding collision with the avoidance target.

Figure 4:
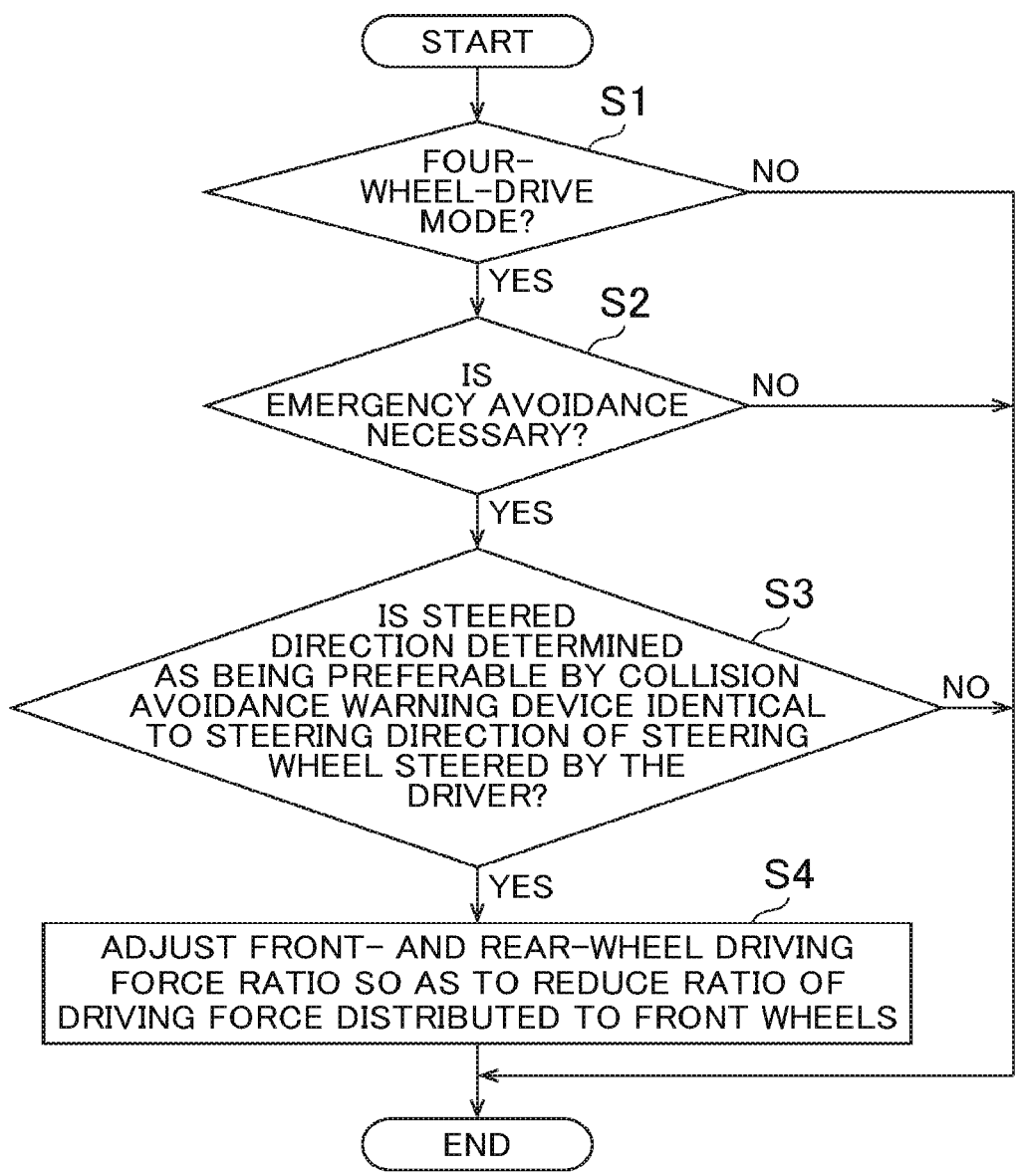
FIG. 4 is a flowchart illustrating an example of a procedure performed by a control device for avoiding collision with an avoidance target.

FIG. 4 is a flowchart illustrating an example of a procedure performed by the control device 5 for avoiding collision with an avoidance target. The control device 5 repeatedly performs the procedure illustrated in the flowchart at predetermined time intervals.

In the procedure illustrated in the flowchart of FIG. 4, the control device 5 determines whether a drive mode selected using the drive-mode selector switch 64 is the four-wheel-drive mode (step S1). Upon determining that the drive mode is the four-wheel-drive mode (S1: Yes), the control device 5 determines whether the collision avoidance warning device 4 has detected an avoidance target or, in other words, whether emergency avoidance is necessary, based on a signal output from the collision avoidance warning device 4 (step S2).

Upon determining that the collision avoidance warning device 4 has detected an avoidance target (S2: Yes), the control device 5 determines whether a steered direction determined as being preferable by the collision avoidance warning device 4 is identical to a steering direction of the steering wheel 30 steered by the driver (step S3). Upon determining that the directions are identical (S3: Yes), the control device 5 controls the clutch system 234 so as to reduce the driving force transmitted to the front wheels 11 and 12. In other words, the control device 5 adjusts the front- and rear-wheel driving force ratio so as to reduce the driving force of the front wheels 11 and 12 (step S4). In step S4, the driving force transmitted to the front wheels 11 and 12 may be reduced to zero.

The control device 5 continues performing step S4 where the control device 5 reduces the driving force transmitted to the front wheels 11 and 12 until it is determined that collision with the avoidance target has been avoided based on, for example, a signal output from the collision avoidance warning device 4. When a result of determination at any one of steps S1 to S3 is No, the control device 5 does not perform step S4.

When it is detected that emergency avoidance to avoid collision with an avoidance target is necessary, the series of the procedure described above increases cornering ability of the four-wheel-drive vehicle 1 and facilitates avoiding the avoidance target according to the principle described above. In step S1, the answer may also be "Yes" when the locked mode is selected.

Figure 5:
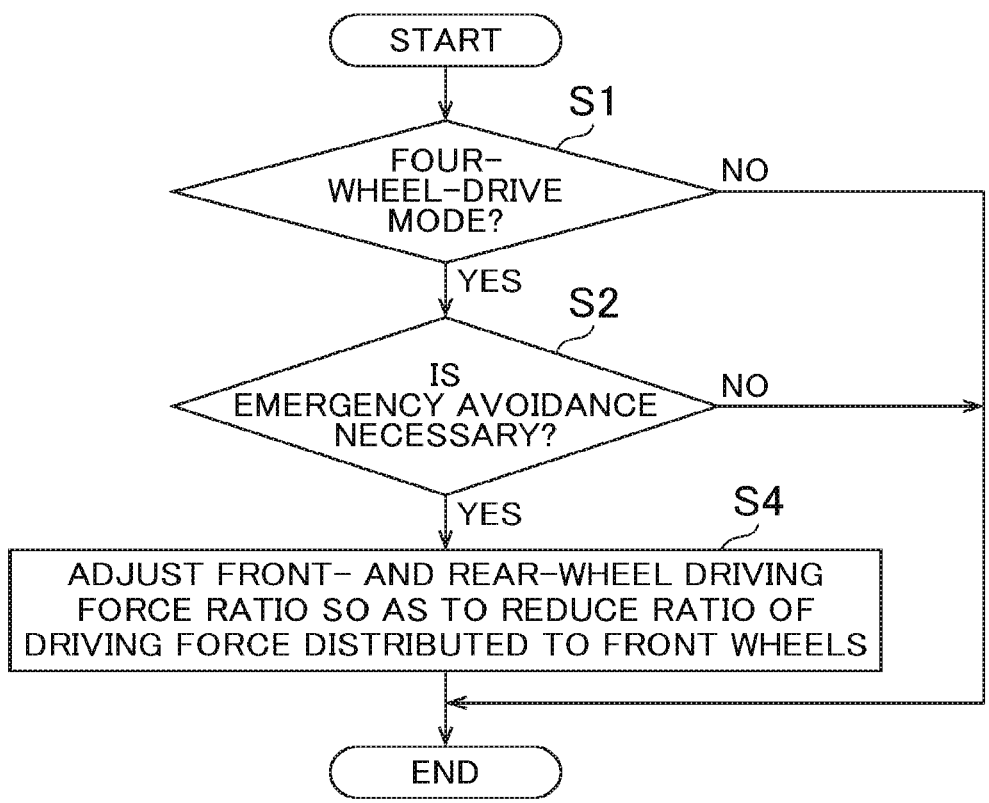
FIG. 5 is a flowchart illustrating another example of a procedure performed by the control device.

FIG. 5 is a flowchart illustrating another example of the procedure performed by the control device 5. In the example procedure illustrated in the flowchart of FIG. 4, when it is detected that emergency avoidance is necessary, the frontand rear-wheel driving force ratio is adjusted so as to reduce the driving force ratio of the front wheels 11 and 12 on condition that the steered direction determined as being preferable by the collision avoidance warning device 4 is identical to the steering direction of the steering wheel 30 steered by a driver. In the flowchart illustrated in FIG. 5, where step S3 in the flowchart in FIG. 4 is omitted, step S4 that adjusts the front- and rear-wheel driving force ratio so as to reduce the driving force ratio of the front wheels 11 and 12 is performed immediately when it is detected that emergency avoidance is necessary in step S2.

The procedure of FIG. 5 allows performing step S4 even when, for example, the driver has not started steering the steering wheel 30 yet, so that the driving force of the front wheels 11 and 12 can be reduced to increase the cornering ability more quickly. In this case, the collision avoidance warning device 4 does not need to determine a direction to which the front wheels 11 and 12 are to be steered, right or left, for emergency avoidance.

According to the embodiment described above, cornering ability can be increased for emergency avoidance to avoid collision with an avoidance target by steering the front wheels 11 and 12. Because avoiding collision with the avoidance target is facilitated, safety is increased.

It is to be understood that various modifications can be made to the invention without departing from the spirit thereof. For example, according to the embodiment above, the powertrain 2 is configured to distribute the driving force of the driving source (the engine 21) to the front wheels and the rear wheels. However, the configuration of the powertrain is not limited thereto. The powertrain may include a front-wheel driving source for driving the right and left front wheels and a rear-wheel driving source for driving the right and left rear wheels. In this case, when it is detected that emergency avoidance is necessary, the control device adjusts the front- and rear-wheel driving force ratio by reducing the driving force of the front-wheel driving source.

The invention is applicable to a four-wheel-drive vehicle in which an electric motor (in-wheel motor), for example, is attached to each of a left front wheel, a right front wheel, a left rear wheel, and a right rear wheel. In this case, when it is detected that emergency avoidance is necessary, the control device adjusts the front- and rear-wheel driving force ratio by reducing outputs of the motors for the left front wheel and the right front wheel.

What is claimed is:

1. A four-wheel-drive vehicle comprising:
   a powertrain that adjusts a front- and rear-wheel driving force ratio that is a ratio between a driving force of front wheels and a driving force of rear wheels; and
   a control device that controls the powertrain, wherein
   the control device adjusts the front- and rear-wheel driving force ratio so as to reduce the driving force of the front wheels that are steered wheels, when it is detected that emergency avoidance to avoid collision with an avoidance target ahead in a traveling direction is necessary,
   wherein the control device adjusts the front- and rear-wheel driving force ratio so as to reduce the driving force of the front wheels on condition that a steered direction of the front wheels determined as being preferable for avoiding collision with the avoidance target is identical to a steering direction of a steering member steered by a driver.

2. The four-wheel-drive vehicle according to claim 1, wherein
   the powertrain is configured to transmit a driving force from a driving source to the front wheels via a clutch system that has a variable transmission capacity, and
   when it is detected that the emergency avoidance is necessary, the control device reduces the driving force transmitted to the front wheels by controlling the clutch system.

3. The four-wheel-drive vehicle according to claim 1, wherein
   the powertrain is configured to transmit a driving force from a driving source to the front wheels via a clutch system that has a variable transmission capacity, and
   when it is detected that the emergency avoidance is necessary, the control device reduces the driving force transmitted to the front wheels by controlling the clutch system.

4. The four-wheel-drive vehicle according to claim 1, further comprising:
   a camera that captures images, wherein
   the control device determines a relative position and a relative distance between the four-wheel-drive vehicle and an obstacle other than the avoidance target based on the images captured by the camera, and
   the steered direction of the front wheels determined as being preferable is based on the relative distance between the four-wheel-drive vehicle and the obstacle.

* * * * *